US012571634B2

(12) United States Patent
Stephens et al.

(10) Patent No.: US 12,571,634 B2
(45) Date of Patent: Mar. 10, 2026

(54) APPARATUS AND METHOD FOR CELESTIAL NAVIGATION USING REGION OF INTEREST SUBSAMPLING

(71) Applicant: Honeywell International Inc., Charlotte, NC (US)

(72) Inventors: Trevor Keith Stephens, Maple Grove, MN (US); Ross Merritt, Minneapolis, MN (US); Brian Schipper, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 331 days.

(21) Appl. No.: 18/487,778

(22) Filed: Oct. 16, 2023

(65) Prior Publication Data

US 2025/0123104 A1 Apr. 17, 2025

(51) Int. Cl.
*G06T 7/11* (2017.01)
*G01C 21/02* (2006.01)
(Continued)

(52) U.S. Cl.
CPC .............. *G01C 21/025* (2013.01); *G06T 5/70* (2024.01); *G06T 7/11* (2017.01); *G06T 7/20* (2013.01); *G06T 2207/20224* (2013.01)

(58) Field of Classification Search
CPC .... G01C 21/025; G01C 17/34; G01C 21/005; G01C 1/1656; G01C 21/24; G01C 21/165; G01C 21/1656; G01C 21/04; G01C 21/28; G01C 21/20; G06T 5/70; G06T 7/11; G06T 7/20; G06T 2207/20224; G06T 2207/10032; G06T 2207/30241; G01S 3/7867; G01S 19/47; B64G 1/244; B64G 1/36; B64G 1/361; B64G 1/363;
(Continued)

(56) References Cited

U.S. PATENT DOCUMENTS 9,316,716 B2 * 4/2016 Qin ...................... G01C 21/025
9,702,702 B1 * 7/2017 Lane ...................... G06T 7/215
(Continued)

FOREIGN PATENT DOCUMENTS

CN 104075713 A * 10/2014 ........... G01C 21/165
CN 106595645 A 4/2017
(Continued)

OTHER PUBLICATIONS

European Patent Office, "Extended European Search Report", dated Apr. 29, 2025, from EP Application No. 24204337.0, from Foreign Counterpart to U.S. Appl. No. 18/487,778, pp. 1 through 10, Published: EP.

*Primary Examiner* — Jose L Couso
(74) *Attorney, Agent, or Firm* — Fogg & Powers LLC

(57) ABSTRACT

Techniques are disclosed for improving daylight performance of a star tracker. A region of interest (ROI) within a field of view of sky is obtained. The region of interest is divided into sub-ROIs. Sub-ROIs including a candidate celestial object are identified. An angular velocity of each candidate celestial object is determined. The known celestial object is a candidate celestial object identified as having a angular velocity, during a time period, that is within a range of angular velocities about a known angular velocity associated with the known celestial object.

20 Claims, 4 Drawing Sheets

(51) Int. Cl.
    *G06T 5/70*           (2024.01)
    *G06T 7/20*           (2017.01)

(58) Field of Classification Search
    CPC ........ B64G 1/365; B64G 1/369; G05D 3/105;
                    Y02E 10/47; G01V 7/04; G01V 7/16
    See application file for complete search history.

(56) References Cited

U.S. PATENT DOCUMENTS

| | | | |
|---|---|---|---|
| 10,180,327 B1 * | 1/2019 | Lane ......................... G06T 5/73 |
| 11,288,830 B2 | 3/2022 | Jiang et al. |
| 2004/0148068 A1 * | 7/2004 | Fowell ................... B64G 1/361 |
| | | | 701/13 |
| 2008/0046138 A1 * | 2/2008 | Fowell ................... B64G 1/244 |
| | | | 701/13 |
| 2014/0236401 A1 * | 8/2014 | Tsao ......................... B64G 3/00 |
| | | | 701/13 |
| 2019/0078894 A1 * | 3/2019 | Waldron .............. G01C 21/025 |
| 2019/0367191 A1 * | 12/2019 | Wasson ................... B64G 1/361 |
| 2022/0084217 A1 * | 3/2022 | Cidonio ................. B64G 1/244 |
| 2023/0215039 A1 * | 7/2023 | Pignol ................... B64G 1/361 |
| | | | 382/103 |
| 2024/0158104 A1 * | 5/2024 | Dor ......................... G06V 20/64 |

FOREIGN PATENT DOCUMENTS

| | | | | |
|---|---|---|---|---|
| CN | 108960213 A | | 12/2018 | |
| CN | 111024063 A | | 4/2020 | |
| CN | 113252029 A | * | 8/2021 | ............. G06F 17/16 |
| CN | 113607163 A | | 11/2021 | |
| CN | 114076596 A | * | 2/2022 | ............. G01C 21/20 |
| CN | 115439350 A | | 12/2022 | |
| KR | 101958270 B1 | | 3/2019 | |
| WO | 2008045014 A3 | | 5/2009 | |

* cited by examiner

330

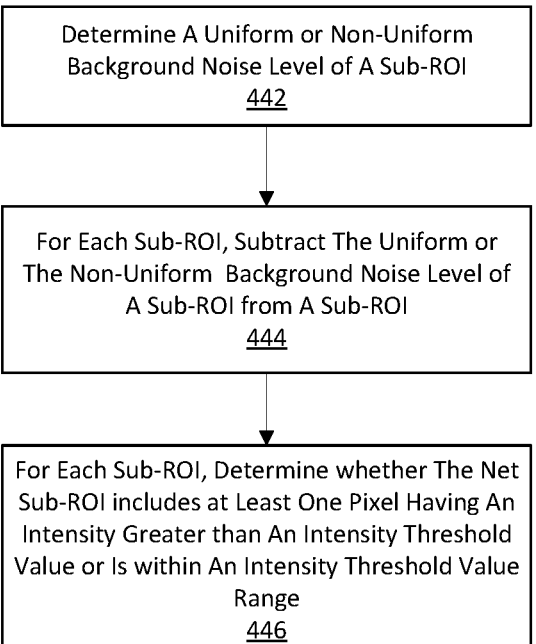

438

Determine A Uniform or Non-Uniform
Background Noise Level of A Sub-ROI
442

For Each Sub-ROI, Subtract The Uniform or
The Non-Uniform Background Noise Level of
A Sub-ROI from A Sub-ROI
444

For Each Sub-ROI, Determine whether The Net
Sub-ROI includes at Least One Pixel Having An
Intensity Greater than An Intensity Threshold
Value or Is within An Intensity Threshold Value
Range
446

FIG. 4

APPARATUS AND METHOD FOR CELESTIAL NAVIGATION USING REGION OF INTEREST SUBSAMPLING

BACKGROUND

A celestial navigation system is used to correct errors, such as drift, in inertial sensors in an inertial measurement unit (IMU) of a navigation system, e.g., used in a vehicle such as a fixed-wing aircraft. The celestial navigation system can also be used as an absolute position aide when a global navigation satellite system (GNSS) receiver, of the navigation system, suffers interference due to jamming and/or spoofing.

One example of a celestial navigation system uses a star tracker. The star tracker is an optical device used to determine location based upon the location of at least one celestial object, e.g., a star or satellite. The star tracker determines a two-dimensional reference frame indicating the position of the celestial object, e.g., in terms of a polar or Cartesian coordinate system.

Conventionally, when in Earth's atmosphere, a star tracker is only used at nighttime. During daylight, the star tracker receives both increased and non-uniform background light, caused by sunlight, in comparison to nighttime usage. Sunlight scatters as it is reflected from particulates in the atmosphere creating the non-uniform background light. Because of the non-uniform background intensity, conventional background subtraction algorithms are unable to be used to satisfactorily improve signal to noise ratio for celestial object detection.

As a result, signal to noise ratio of a signal representing a celestial object received during the daytime is greatly diminished. Thus, it is difficult or impossible to distinguish the celestial object from such background noise during daylight. Thus, a star tracker is conventionally not used to assist with navigation during daylight when operating within dense portions of the earth's atmosphere.

SUMMARY

In some aspects, the techniques described herein relate to a method of tracking a known celestial object with a star tracker configured to be on a body, the method including: obtaining a region of interest (ROI) within a field of view of sky; dividing the region of interest into N integer sub-ROIs; identifying each sub-ROI including a candidate celestial object; determining an angular velocity of each candidate celestial object; and identifying the known celestial object that is a candidate celestial object having an angular velocity, during a time period, that is within a range of angular velocities about a known angular velocity associated with the known celestial object.

In some aspects, the techniques described herein relate to a non-transitory computer readable medium storing a program causing at least one processor to execute a process to track a known celestial object with a star tracker configured to be on a body, the process including: obtaining a region of interest (ROI) within a field of view of sky; dividing the region of interest into N integer sub-ROIs; identifying each sub-ROI including a candidate celestial object; determining an angular velocity of each candidate celestial object; and identifying the known celestial object that is a candidate celestial object having an angular velocity, during a time period, that is within a range of angular velocities about a known angular velocity associated with the known celestial object.

In some aspects, the techniques described herein relate to an apparatus for tracking a known celestial object with a star tracker configured to be on a body, including: processing circuitry configured to be coupled to an inertial measurement unit; and the star tracker communicatively coupled to the processing circuitry; wherein the processing circuitry is configured to: obtain a region of interest (ROI) within a field of view of sky of the star tracker; divide the region of interest into N integer sub-ROIs; identify each sub-ROI including a candidate celestial object; determine an angular velocity of each candidate celestial object; and identify the known celestial object that is a candidate celestial object having an angular velocity, during a time period, that is within a range of angular velocities about a known angular velocity associated with the known celestial object.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 4 illustrates a flow diagram of one embodiment of a method of determining each sub-region of interest including a candidate celestial object.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
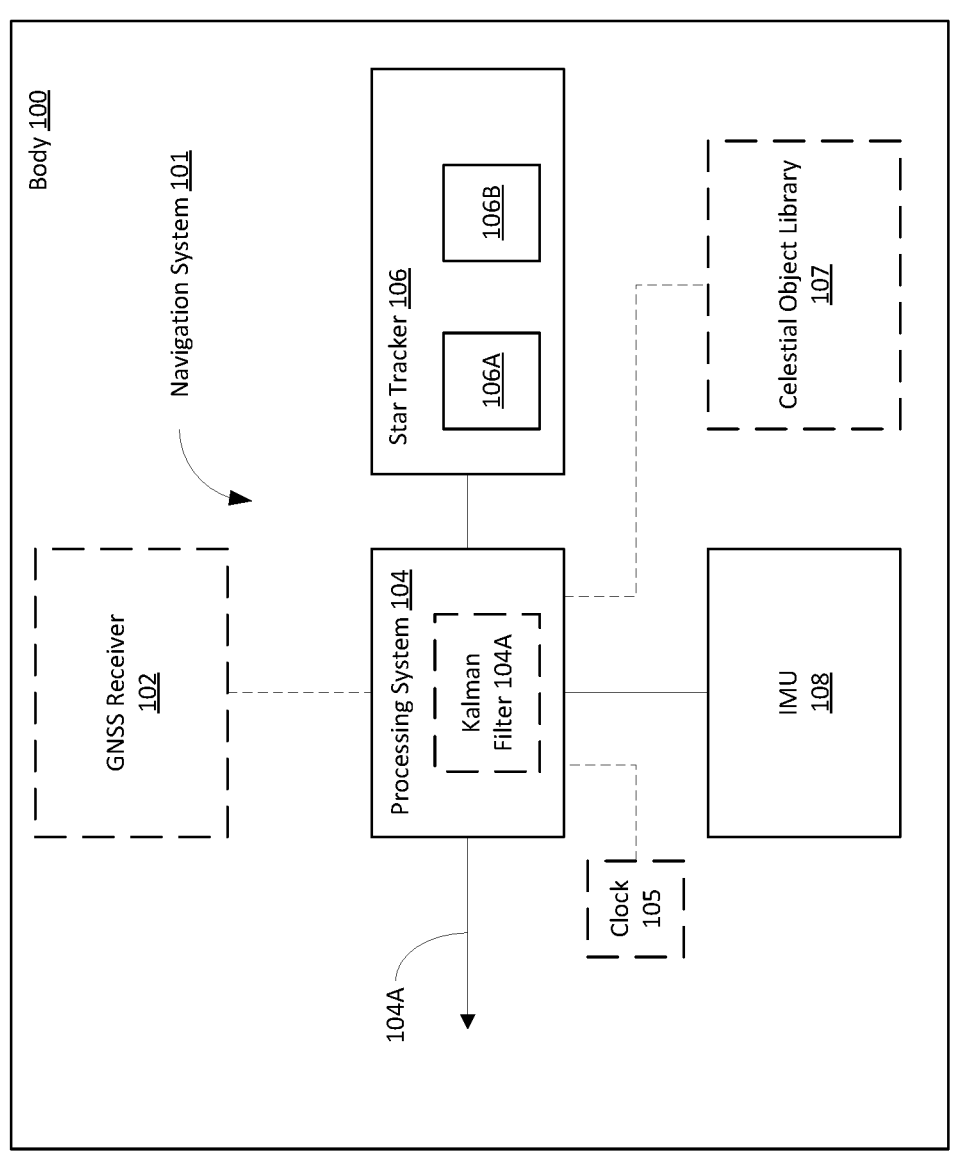
FIG. 1 illustrates a block diagram a body including a navigation system according to embodiments of the invention.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the invention are an improvement to navigation technology by permitting the use of a star tracker during daylight, particularly when operating in a dense portion of the earth's atmosphere, to aid in navigation. Techniques are described herein which permit a star tracker to be utilized, e.g., with an inertial measurement unit and optionally with a GNSS receiver, during daylight hours. However, such techniques can be used not only during daytime, but also during nighttime. Thus, a body including the star tracker, the inertial measurement unit, and optionally a GNSS receiver can more accurately determine state variables of the body during daylight hours. For example, a navigation system, of a body, relying on a GNSS receiver can more accurately determine state variables of the body when the GNSS receiver is being spoofed and/or jammed.

In one embodiment of the invention, the following technique is used. A region of interest (ROI) of the optical image is obtained. The region of interest includes a known celestial object. The known celestial object may be a star or a low Earth orbit (LEO) resident space object (RSO), e.g., LEO satellite or LEO space debris.

The region of interest is divided into more than one sub-region of interest (sub-ROI). Noise from daylight noise can be more accurately removed from a smaller area of an image, e.g., a sub-ROI. Sub-ROIs including a candidate celestial object are then identified. A candidate celestial object means the known celestial object or an optical aberration arising from the aforementioned light scattering.

The known celestial object is then discerned, e.g., from one or more other candidate celestial objects by determining that it has an angular velocity that is within a range of angular velocities about a known angular velocity of the known celestial object. Optionally, if only one candidate celestial object is identified in the ROI, then it may be deemed the known celestial object.

FIG. 1 illustrates a block diagram a body 100 including a navigation system 101 according to embodiments of the invention. Optionally, the body 100 is a vehicle, an animal, a human being, or any other entity configured to travel on or in the Earth or the Earth's atmosphere or anywhere around the Earth.

The navigation system 101 includes a processing system (or processing circuitry) 104 configured to be physically and communicatively coupled to a star tracker 106 and an IMU 108. The processing system 104 is configured to perform methods and/or techniques described elsewhere herein. Optionally, the processing system 104 may perform other methods too.

Optionally, the navigation system 101 includes a celestial object library 107 communicatively coupled to the processing system 104. Alternatively, the processing system 104 includes the celestial object library. The celestial object library includes position and/or velocity of known celestial objects.

The star tracker 106 includes an optical detector 106A. Optionally, the star tracker 106 also includes a star tracker positioning system 106B, e.g., a motorized gimbled mount, configured to alter an orientation of the optical detector 106A.

Optionally, the processing system 104 is also configured to be communicatively coupled to a GNSS[1] receiver 102. The GNSS receiver 102 is configured to determine at least a three-dimensional position of the body 100 and the velocity of the body 100. Optionally, the processing system 104, e.g., a Kalman filter 104A therein, is configured to update position states of the body 100.

[1] The GNSS may be one of global positioning satellite (GPS), Galileo, BeiDou, GLONASS, and any other GNSS systems.

The IMU 108 includes one or more accelerometers and/or one or more gyroscope(s), and is configured to measure acceleration and/or angular rate of rotation in one or more axes, e.g., three axes, in a local reference frame of the body 100. The processing system 104, e.g., the Kalman filter 104A therein, is configured to generate an estimate of attitude of the body.

The processing system 104 includes an output configured to provide state information about the body 100. Such state information includes one or more of the following: position (in one, two, or three dimensions), pitch, roll, yaw, and three-dimensional velocity. Optionally, the processing system 104 includes the Kalman filter 104A configured to generate estimates of the state information about the body 100 with reduced error by utilizing measurements from the IMU 108, the star tracker 106, and optionally, the GNSS receiver 102.

The processing system 104 is further configured to receive state data[2] about the body from the IMU 108, and optionally from the optional GNSS receiver 102. Optionally, the processing system 104 includes a clock or is alternatively communicatively coupled to a clock 105. Such a clock is configured to measure time.

[2] The state data received from the IMU 108 by the processing system 104 includes acceleration and/or rotational rate information discussed elsewhere herein. The state received from the optional GNSS receiver 102 by the processing system 104 includes position and velocity information as discussed elsewhere herein.

Figure 2:
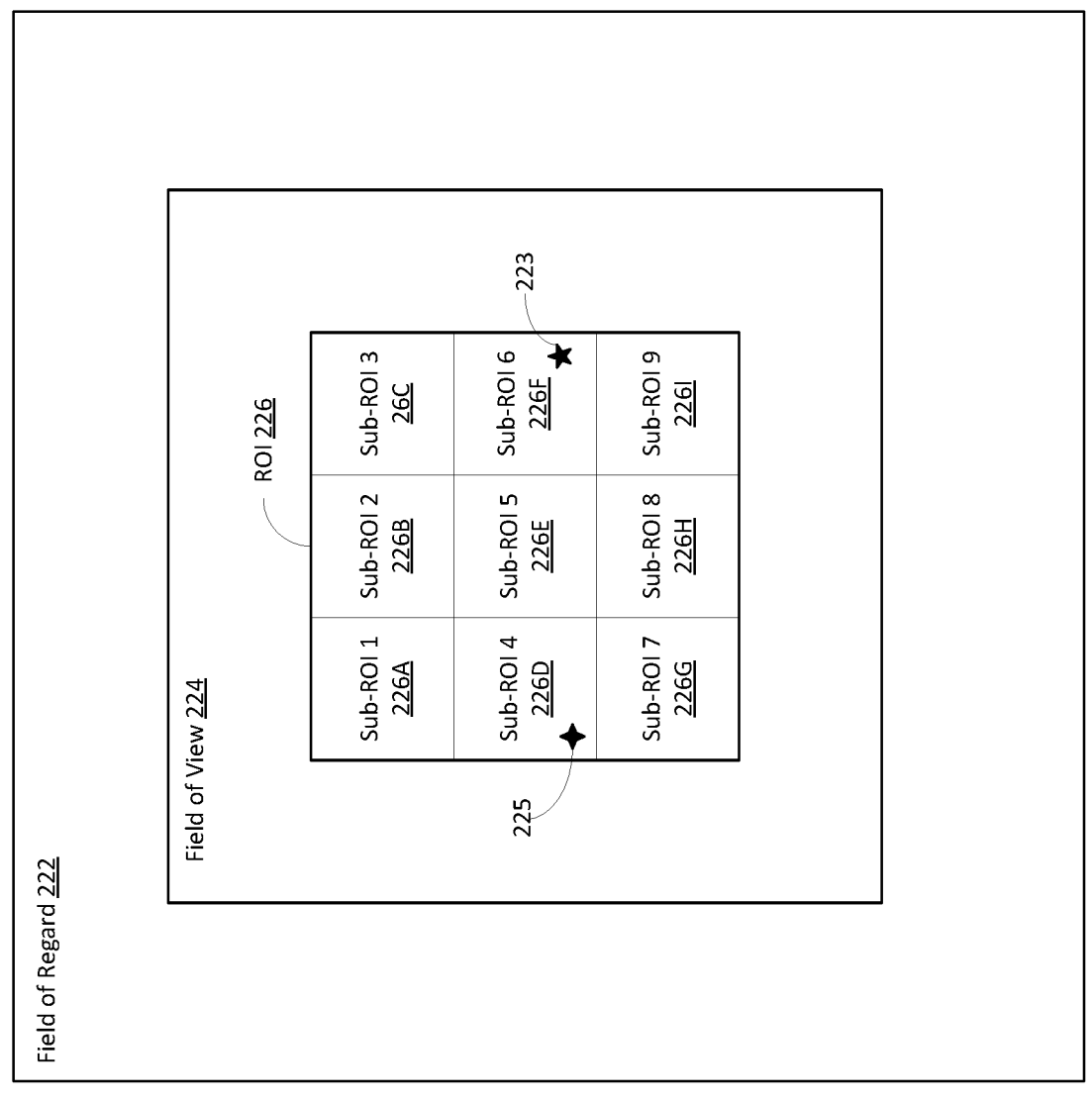
FIG. 2 illustrates a diagram of one embodiment of sub-regions of interest.

FIG. 2 illustrates a diagram of one embodiment of sub-regions of interest 226A-226I. FIG. 2 also illustrates a field of regard (FOR) 222 which includes a field of view (FOV) 224.

Field of regard means a total portion of sky that can be imaged by a star tracker 106 whose optical detector 106A is moveable, e.g., by the star tracker positioning system 106B. Field of view means an image, e.g., of sky, incident on the optical detector 106A of the star tracker 106. Field of view is typically an image of a subset of the field of regard.

The field of view 224 includes a region of interest 226. Region of interest means a portion of the field of view that includes, e.g., is centered about an expected location of, the known celestial object, and whose peripheral (or border) dimensions are derived from uncertainties in the star tracker and optionally any other navigational component (e.g., the inertial measurement unit and/or the GNSS receiver) utilized with the star tracker 106 by the navigation system 101.

The region of interest 226 is sub-sampled, i.e., the region of interest 226 is divided into more than one sub-region of interest (sub-ROI). The number of sub-ROIs is an integer number greater than one, and optionally is a plurality of sub-ROIs. Optionally, each sub-ROI has the same area and/or circumferential shape. Optionally, each sub-ROI is distinct from all other sub-ROIs; however, alternatively, one or more sub-ROIs may overlap one or more other sub-ROIs.

An exemplary candidate celestial object that is a known celestial object 223 is illustrated in a sixth sub-ROI (sub-ROI 6) 226F of the ROI 226. An exemplary candidate celestial object 225 that is not a known celestial object (e.g., that arises due to daylight) is illustrated in a fourth sub-ROI (sub-ROI 4) 226D.

When creating more than one, e.g., a plurality, of sub-ROIs, a background noise can be estimated for each sub-ROI. The background noise of a sub-ROI can then be subtracted from the sub-ROI. Such techniques are further explicated elsewhere herein.

Figure 3:
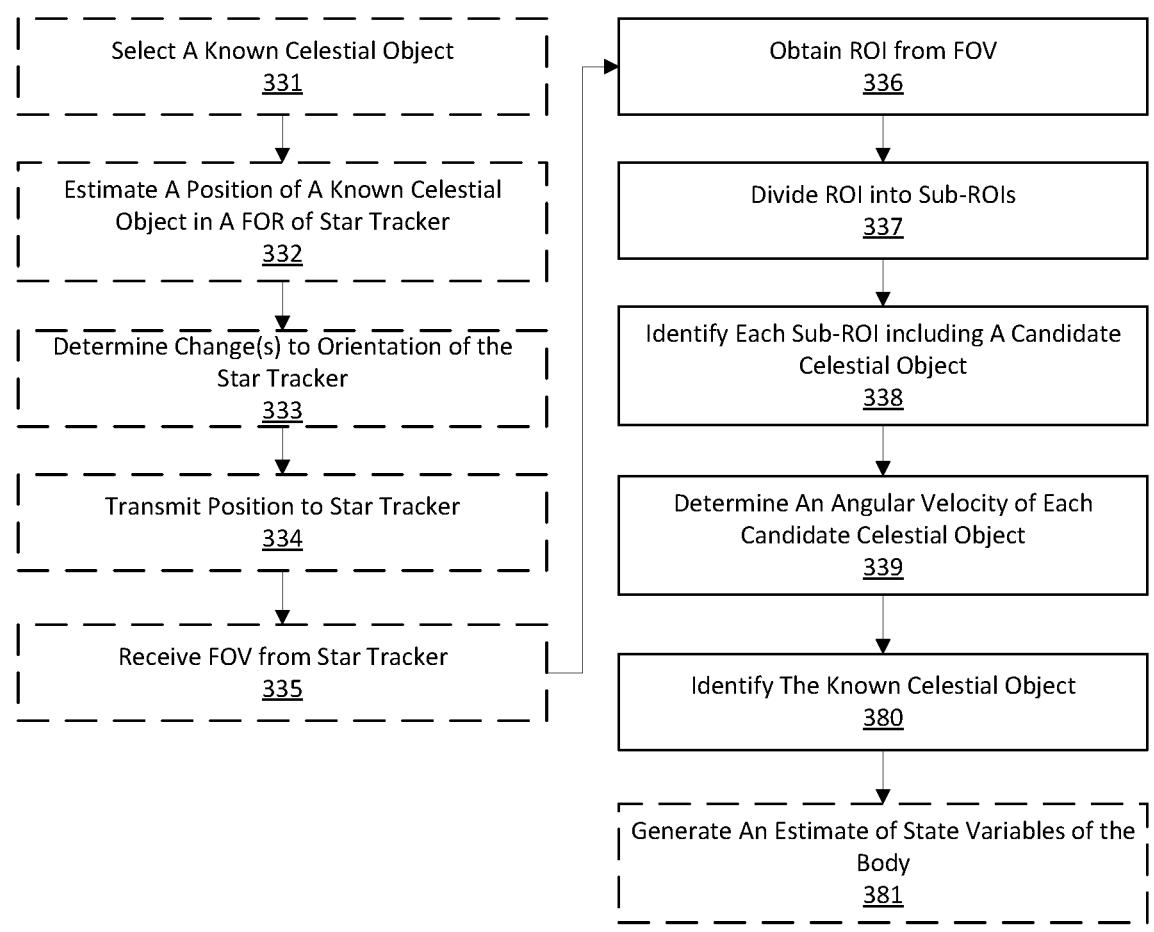
FIG. 3 illustrates a flow diagram of one embodiment of a method of tracking a known celestial object.

FIG. 3 illustrates a flow diagram of one embodiment of a method 330 of tracking a known celestial object. Optionally, method 330 is implemented, at least in part, by the processing system 104.

To the extent that the embodiment of a method shown in a Figure herein is described herein as being implemented with item(s) shown in FIGS. 1 and/or 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in a Figure) can occur in a different order (for example, where at least some of the processing associated with the blocks is performed in parallel and/or in an event-driven manner).

In optional block 331, locations for all celestial objects within the celestial object library 107 which are currently visible within the FOR 222 are computed based on an estimated position and attitude (e.g., roll, pitch, yaw, and vector direction) of the body 100. A known celestial object is selected from the celestial object(s) determined to be visible within the FOR 222.

In block 332, a position of a known celestial object in a field of regard of the star tracker is estimated. This may be performed by obtaining data about the known celestial object from a celestial object library 107 and estimates of state variables of the body 100 and the optical detector 106A of the star tracker 106.

In optional block 333, one or more changes to an orientation of the star tracker 106, e.g., the optical detector 106A, are determined. Block 333 may be used when orientation of the star tracker 106, e.g., the optical detector 106A, can be changed, e.g., with the star tracker positioning system 106B or by affecting movement of the body 100 itself. Optionally, the changes to orientation of the star tracker 106, e.g., the optical detector 106A, are made to center an estimated position of the known celestial object in a center of the field of view 224. In optional block 334, changes to orientation of the star tracker 106, e.g., the optical detector 106A, are transmitted to the star tracker 106 which is configured to change orientation of the star tracker 106, e.g., the optical detector 106A, using such changes.

In block 335, a field of view 224 is received from the star tracker 106. In block 336, a region of interest 226 is obtained from the field of view of the star tracker 106. In block 337, the region of interest 226 is divided into, e.g., N integer, sub-regions of interest.

In block 338, each sub-region of interest 226A-226I including a candidate celestial object is identified. FIG. 4 illustrates a flow diagram of one embodiment of a method 438 of identifying each sub-region of interest 226A-226I including a candidate celestial object. Optionally, the method 438 is implemented by the processing system 104. Block 338 may be implemented in other ways, e.g., by ascertaining in each net sub-ROI (described elsewhere herein) whether a mean or a median intensity of adjacent pixels, having an intensity greater than zero, is greater than an intensity threshold value or is within an intensity threshold value range Blocks 442, 444, and 446 are performed for each sub-ROI. In block 442, a uniform or a non-uniform background noise level of each sub-region of interest 226A-226I is determined. The uniform background noise level may be, for example, a mean or median intensity level of a sub-region of interest 226A-226I. The non-uniform background noise may be determined with surface fitting (e.g., to minimize error with respect to the whole surface) and may be represented by a linear or non-linear mathematical function (or model) for which position in the image is a dependent variable. The mathematical function (or model) is used in performing the subtraction. An example of the non-uniform noise is an increasing or decreasing gradient of noise level with respect to one or both axis of a surface of an image produced by the optical detector 106A.

Optionally, whether the background noise is uniform or non-uniform is first determined in order to determine either the uniform or the non-uniform background noise level. Optionally, determination as to whether the background noise is uniform or non-uniform may be made by determining whether the intensity of each pixel in the sub-ROI is within a threshold intensity range.

In block 444, for each sub-region of interest 226A-226I, a net sub-region of interest is determined by subtracting the uniform background noise level from a subregion of interest. In block 446, for each net sub-region of interest 226A-226I, it is determined whether the net sub-region of interest includes at least one pixel having an intensity greater than an intensity threshold value or is within an intensity threshold value range.

Returning to FIG. 3, in block 339, an angular velocity of each candidate celestial object is determined. Optionally, such angular velocity may be determined using a change in angular position during a time period, e.g., a first time period, over image frames spanning that time period.

In block 380, a candidate celestial object in a sub-ROI is identified as the known celestial object from a set of the candidate celestial bodies in one or more sub-ROIs. The known celestial object is the candidate celestial object, in a sub-ROI, having an angular velocity, during another time period (e.g., a second time period), that is within a range of angular velocities about a known angular velocity associated with the known celestial object. Optionally, the known angular velocity associated with the known celestial object is obtained from the celestial object library.

In optional block 381, once the known celestial object is identified, information about the known celestial object is used by the processing system 104, e.g., the Kalman filter 104A, to generate an estimate of state variables of the body 100 with reduced error (or increased accuracy) using information derived from the known celestial object and information received from the inertial measurement unit 108. An error in attitude (e.g., roll, pitch, yaw, and vector direction) of the body 100 generated by the navigation system 101 may be corrected when selecting a known celestial object that is a star. When the known celestial object is a star (and thus has a relatively fixed position relative to the body 100), a measured line of sight vector from the body 100 to the star is determined using the two-dimensional location of the star in the field of view of the optical detector 106A. A known line of sight is determined, e.g., using a known position of the star obtained from the celestial object library. An attitude difference between the measured and known position of the star is determined (which corresponds to an error in attitude of the body 100 generated by the navigation system 101, e.g., the processing system 104). The attitude difference may be included in a measurement sensitivity matrix of a Kalman filter to reduce error (e.g., attitude error) in the estimated state variables for example generated by the processing system 104.

An error in position of the body 100 generated by the navigation system 101 may be corrected when selecting a known celestial object that is a LEO RSO. When the known celestial object is a LEO RSO, a measured vector direction of the LEO RSO may be determined by the processing system 104 based on movement of the LEO RSO detected by the processing system 104 over a time period. A known vector direction (or trajectory) of the LEO RSO for the same time period may be obtained from data provided by the celestial object library. An angular difference is calculated by taking a difference of the measured and the known vector directions. The angular difference is scaled by a distance between the body 100 and the LEO RSO to obtain information about errors in position of the body generated by the navigation system 101, e.g., the processing system 104. The angular difference may be included in a measurement sensitivity matrix of a Kalman filter to reduce error (e.g., position error) in the estimated state variables for example generated by the processing system 104.

The processing system 104 may be a state machine, a neural network, or a quantum computer. Optionally, the processing system 104 may comprise at least one processor (or processor circuitry) and at least one memory (or memory circuitry).

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

EXAMPLE EMBODIMENTS

Example 1 includes a method of tracking a known celestial object with a star tracker configured to be on a body, the method comprising: obtaining a region of interest (ROI) within a field of view of sky; dividing the region of interest into N integer sub-ROIs; identifying each sub-ROI including a candidate celestial object; determining an angular velocity of each candidate celestial object; and identifying the known celestial object that is a candidate celestial object having an angular velocity, during a time period, that is within a range of angular velocities about a known angular velocity associated with the known celestial object.

Example 2 includes the method of Example 1, wherein identifying each sub-ROI including the candidate celestial object comprises performing for each sub-ROI: determining a background noise level of a sub-ROI; determining a net sub-ROI by subtracting the background noise level of the sub-ROI from the sub-ROI; and determining whether the net sub-ROI includes at least one pixel having an intensity greater than an intensity threshold value or within an intensity threshold value range.

Example 3 includes the method of Example 2, wherein the background noise level is non-uniform and is modelled by a mathematical function used for the subtraction.

Example 4 includes the method of any of Examples 1-3, further comprising, upon identifying the known celestial object, then generating an estimate of state variables of the body with reduced error utilizing information derived from the known celestial object and information received from an inertial measurement unit.

Example 5 includes the method of Example 4, wherein generating the estimate of state variables of the body comprises generating a difference in angle between a measured and a known direction of the known celestial object; wherein when the known celestial object is a star; wherein the difference is used to generate the estimate of state variable of the body with reduced attitude error.

Example 6 includes the method of any of Examples 4-5, wherein generating the estimate of state variables of the body comprises generating an angular difference between a measured and a known position of the known celestial object; wherein the known celestial object is a low Earth orbit resident space object; wherein the angular difference is used to generate the estimate of state variables of the body with reduced position error.

Example 7 includes a non-transitory computer readable medium storing a program causing at least one processor to execute a process to track a known celestial object with a star tracker configured to be on a body, the process comprising: obtaining a region of interest (ROI) within a field of view of sky; dividing the region of interest into N integer sub-ROIs; identifying each sub-ROI including a candidate celestial object; determining an angular velocity of each candidate celestial object; and identifying the known celestial object that is a candidate celestial object having an angular velocity, during a time period, that is within a range of angular velocities about a known angular velocity associated with the known celestial object.

Example 8 includes the non-transitory computer readable medium of Example 7, wherein identifying each sub-ROI including the candidate celestial object comprises performing for each sub-ROI: determining a background noise level of a sub-ROI; determining a net sub-ROI by subtracting the background noise level of the sub-ROI from the sub-ROI; and determining whether the net sub-ROI includes at least one pixel having an intensity greater than an intensity threshold value or within an intensity threshold value range.

Example 9 includes the non-transitory computer readable medium of Example 8, wherein the background noise level is non-uniform and is modelled by a mathematical function used for the subtraction.

Example 10 includes the non-transitory computer readable medium of any of Examples 7-9, wherein the process further comprises, upon identifying the known celestial object, then generating an estimate of state variables of the body with reduced error utilizing information derived from the known celestial object and information received from an inertial measurement unit.

Example 11 includes the non-transitory computer readable medium of Example 10, wherein generating the estimate of state variables of the body comprises generating a difference in angle between a measured and a known direction of the known celestial object; wherein when the known celestial object is a star; wherein the difference is used to generate the estimate of state variable of the body with reduced attitude error.

Example 12 includes the non-transitory computer readable medium of any of Examples 10-11, wherein generating the estimate of state variables of the body comprises generating an angular difference between a measured and a known position of the known celestial object; wherein the known celestial object is a low Earth orbit resident space object; wherein the angular difference is used to generate the estimate of state variables of the body with reduced position error.

Example 13 includes an apparatus for tracking a known celestial object with a star tracker configured to be on a body, comprising: processing circuitry configured to be coupled to an inertial measurement unit; and the star tracker communicatively coupled to the processing circuitry; wherein the processing circuitry is configured to: obtain a region of interest (ROI) within a field of view of sky of the star tracker; divide the region of interest into N integer sub-ROIs; identify each sub-ROI including a candidate celestial object; determine an angular velocity of each candidate celestial object; and identify the known celestial object that is a candidate celestial object having an angular velocity, during a time period, that is within a range of angular velocities about a known angular velocity associated with the known celestial object.

Example 14 includes the apparatus of Example 13, wherein identify each sub-ROI including the candidate celestial object comprises performing for each sub-ROI: determine a background noise level of a sub-ROI; determining a net sub-ROI by subtracting the background noise level of the sub-ROI from the sub-ROI; and determine whether the net sub-ROI includes at least one pixel having an intensity greater than an intensity threshold value or within an intensity threshold value range.

Example 15 includes the apparatus of Example 14, wherein the background noise level is non-uniform and is modelled by a mathematical function used for the subtraction.

Example 16 includes the apparatus of any of Examples 13-15, wherein the processing circuitry is further configured to, upon identifying the known celestial object, then generate an estimate of state variables of the body with reduced error utilizing information derived from the known celestial object and information received from an inertial management unit.

Example 17 includes the apparatus of Example 16 wherein generate the estimate of state variables of the body comprises generate a difference in angle between a measured and a known direction of the known celestial object; wherein when the known celestial object is a star; wherein the difference is used to generate the estimate of state variable of the body with reduced attitude error.

Example 18 includes the apparatus of any of Examples 16-17, wherein generating the estimate of state variables of the body comprises generate the estimate of state variables of the body comprises generate an angular difference between a measured and a known position of the known celestial object; wherein the known celestial object is a low Earth orbit resident space object; wherein the angular difference is used to generate the estimate of state variables of the body with reduced position error.

Example 19 includes the apparatus of any of Examples 16-18, wherein the processing circuitry comprises a Kalman filter configured to generate the estimate of state variables of the body with reduced error utilizing the information derived from the known celestial object and the information received from an inertial measurement unit.

Example 20 includes the apparatus of any of Examples 13-19, wherein the star tracker comprises an optical detector, and a motorized gimbled mount configured to alter an orientation of the optical detector; wherein a field of regard of the star tracker includes the field of view which is incident on the optical detector.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of tracking a known celestial object with a star tracker configured to be on a body, the method comprising:

obtaining a region of interest (ROI) within a field of view of sky;

dividing the region of interest into N integer sub-ROIs;

identifying each sub-ROI including a candidate celestial object;

determining an angular velocity of each candidate celestial object; and identifying the known celestial object that is a candidate celestial object having an angular velocity, during a time period, that is within a range of angular velocities about a known angular velocity associated with the known celestial object.

2. The method of claim 1, wherein identifying each sub-ROI including the candidate celestial object comprises performing for each sub-ROI:

determining a background noise level of a sub-ROI;

determining a net sub-ROI by subtracting the background noise level of the sub-ROI from the sub-ROI; and determining whether the net sub-ROI includes at least one pixel having an intensity greater than an intensity threshold value or within an intensity threshold value range.

3. The method of claim 2, wherein the background noise level is non-uniform and is modelled by a mathematical function used for the subtraction.

4. The method of claim 1, further comprising, upon identifying the known celestial object, then generating an estimate of state variables of the body with reduced error utilizing information derived from the known celestial object and information received from an inertial measurement unit.

5. The method of claim 4, wherein generating the estimate of state variables of the body comprises generating a difference in angle between a measured and a known direction of the known celestial object;

wherein when the known celestial object is a star;

wherein the difference is used to generate the estimate of state variable of the body with reduced attitude error.

6. The method of claim 4, wherein generating the estimate of state variables of the body comprises generating an angular difference between a measured and a known position of the known celestial object;

wherein the known celestial object is a low Earth orbit resident space object;

wherein the angular difference is used to generate the estimate of state variables of the body with reduced position error.

7. A non-transitory computer readable medium storing a program causing at least one processor to execute a process to track a known celestial object with a star tracker configured to be on a body, the process comprising:

obtaining a region of interest (ROI) within a field of view of sky;

dividing the region of interest into N integer sub-ROIs;

identifying each sub-ROI including a candidate celestial object;

determining an angular velocity of each candidate celestial object; and identifying the known celestial object that is a candidate celestial object having an angular velocity, during a time period, that is within a range of angular velocities about a known angular velocity associated with the known celestial object.

8. The non-transitory computer readable medium of claim 7, wherein identifying each sub-ROI including the candidate celestial object comprises performing for each sub-ROI:

determining a background noise level of a sub-ROI;

determining a net sub-ROI by subtracting the background noise level of the sub-ROI from the sub-ROI; and determining whether the net sub-ROI includes at least one pixel having an intensity greater than an intensity threshold value or within an intensity threshold value range.

9. The non-transitory computer readable medium of claim 8, wherein the background noise level is non-uniform and is modelled by a mathematical function used for the subtraction.

10. The non-transitory computer readable medium of claim 7, wherein the process further comprises, upon identifying the known celestial object, then generating an estimate of state variables of the body with reduced error utilizing information derived from the known celestial object and information received from an inertial measurement unit.

11. The non-transitory computer readable medium of claim 10, wherein generating the estimate of state variables of the body comprises generating a difference in angle between a measured and a known direction of the known celestial object;

wherein when the known celestial object is a star;

wherein the difference is used to generate the estimate of state variable of the body with reduced attitude error.

12. The non-transitory computer readable medium of claim 10, wherein generating the estimate of state variables of the body comprises generating an angular difference between a measured and a known position of the known celestial object;

wherein the known celestial object is a low Earth orbit resident space object;

wherein the angular difference is used to generate the estimate of state variables of the body with reduced position error.

13. An apparatus for tracking a known celestial object with a star tracker configured to be on a body, comprising:

processing circuitry configured to be coupled to an inertial measurement unit; and the star tracker communicatively coupled to the processing circuitry;

wherein the processing circuitry is configured to:

obtain a region of interest (ROI) within a field of view of sky of the star tracker;

divide the region of interest into N integer sub-ROIs;

identify each sub-ROI including a candidate celestial object;

determine an angular velocity of each candidate celestial object; and identify the known celestial object that is a candidate celestial object having an angular velocity, during a time period, that is within a range of angular velocities about a known angular velocity associated with the known celestial object.

14. The apparatus of claim 13, wherein identify each sub-ROI including the candidate celestial object comprises performing for each sub-ROI:

determine a background noise level of a sub-ROI;

determining a net sub-ROI by subtracting the background noise level of the sub-ROI from the sub-ROI; and determine whether the net sub-ROI includes at least one pixel having an intensity greater than an intensity threshold value or within an intensity threshold value range.

15. The apparatus of claim 14, wherein the background noise level is non-uniform and is modelled by a mathematical function used for the subtraction.

16. The apparatus of claim 13, wherein the processing circuitry is further configured to, upon identifying the known celestial object, then generate an estimate of state variables of the body with reduced error utilizing information derived from the known celestial object and information received from an inertial management unit.

17. The apparatus of claim 16 wherein generate the estimate of state variables of the body comprises generate a difference in angle between a measured and a known direction of the known celestial object;

wherein when the known celestial object is a star;

wherein the difference is used to generate the estimate of state variable of the body with reduced attitude error.

18. The apparatus of claim 16, wherein generating the estimate of state variables of the body comprises generate the estimate of state variables of the body comprises generating an angular difference between a measured and a known position of the known celestial object;

wherein the known celestial object is a low Earth orbit resident space object;

wherein the angular difference is used to generate the estimate of state variables of the body with reduced position error.

19. The apparatus of claim 16, wherein the processing circuitry comprises a Kalman filter configured to generate the estimate of state variables of the body with reduced error utilizing the information derived from the known celestial object and the information received from an inertial measurement unit.

20. The apparatus of claim 13, wherein the star tracker comprises an optical detector, and a motorized gimbled mount configured to alter an orientation of the optical detector;

wherein a field of regard of the star tracker includes the field of view which is incident on the optical detector.

* * * * *